(12) United States Patent
Sasaki et al.

(10) Patent No.: US 8,328,426 B2
(45) Date of Patent: Dec. 11, 2012

(54) LUBRICATING ARRANGEMENT FOR A JOURNAL BEARING

(75) Inventors: Kenji Sasaki, Wako (JP); Masaru Asari, Wako (JP); Atsushi Sato, Wako (JP); Seiji Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 732 days.

(21) Appl. No.: 12/510,436

(22) Filed: Jul. 28, 2009

(65) Prior Publication Data
US 2010/0089702 A1    Apr. 15, 2010

(30) Foreign Application Priority Data

Oct. 15, 2008  (JP) ................................. 2008-265851

(51) Int. Cl.
*F16C 33/66* (2006.01)
(52) U.S. Cl. .................... 384/322; 384/377; 184/6.26
(58) Field of Classification Search ............. 184/6.26; 384/322, 372–384, 396, 416–419, 462, 466, 384/468
See application file for complete search history.

(56) References Cited

U.S. PATENT DOCUMENTS

| | | | | |
|---|---|---|---|---|
| 4,759,427 A | * | 7/1988 | Onose et al. ............... | 184/6.26 |
| 5,054,583 A | * | 10/1991 | Wrzyszczynski ............ | 184/6.26 |
| 5,097,926 A | * | 3/1992 | Duello ...................... | 184/6.4 |
| 5,743,230 A | * | 4/1998 | Yamazaki et al. ........ | 123/195 H |

FOREIGN PATENT DOCUMENTS

| | | |
|---|---|---|
| JP | 63-147511 A | 6/1988 |
| JP | 06-18009 Y2 | 5/1994 |
| JP | 2002-201924 A | 7/2002 |

\* cited by examiner

*Primary Examiner* — Thomas R Hannon
(74) *Attorney, Agent, or Firm* — Westerman, Hattori, Daniels & Adrian, LLP

(57) ABSTRACT

A rotatable member (40) such as a sprocket is rotatably mounted on a fixed shaft member (32), and a first oil passage (72) extending in a radial direction is formed by a thrust member (36) abutting an axial end surface of the rotating member. The inner end of the first oil passage communicates with a radial bearing interface (A) of the rotatable member, and an oil jet ejected from an orifice (68) of an oil nozzle (66) is directed to an open outer end of the first lubricating oil passage. Because the first oil passage is fixed in position, the radial bearing interface receives an adequate supply of lubricating oil fed from the oil nozzle. The other axial end of the rotating member may be provided with a second lubricating oil passage (82) which also extends in a radial direction, the second lubricating oil passage having an open outer end and an open inner end communicating with the radial bearing interface. The centrifugal force acting on the lubricating oil in the second lubricating oil passage promotes a favorable recirculation of the lubricating oil, and hence a favorable lubrication.

12 Claims, 7 Drawing Sheets

LUBRICATING ARRANGEMENT FOR A JOURNAL BEARING

TECHNICAL FIELD

The present invention relates to a lubricating arrangement for a radial bearing of a power transmitting system, and in particular to a lubricating arrangement suitable for use in a journal bearing of an idler sprocket or pulley for an endless chain, belt or the like.

BACKGROUND OF THE INVENTION

A conventional power transmitting system for actuating a camshaft by using an endless chain or endless belt often includes an idler sprocket or pulley which is typically rotatably supported by a fixed shaft member affixed to an end surface of a cylinder block. A cylindrical bearing metal fitted into a central opening of the sprocket or the like typically forms a radial journal bearing in cooperation with the fixed shaft member.

As an arrangement for lubricating such a radial journal bearing, it is known to feed lubricating oil from an internal oil passage formed in the cylinder block to a radial bearing interface between the outer circumferential surface of the shaft member and inner circumferential surface of the bearing metal fitted in the central opening of the sprocket or the like. The bearing metal may be provided with a radial oil opening for feeding the lubricating oil to the radial bearing interface. See Japanese UM laid open publication No. 06-18009 (patent document 1) and Japanese patent laid open publication No. 2002-201924 (patent document 2).

When the lubricating oil for lubricating the sprocket is drawn from an internal oil passage formed in the cylinder block, the need for such an internal oil passage complicates the structure of the cylinder block, and this causes difficulty in the engine design and increases the manufacturing cost. Also, the limitation on the available space for the internal oil passage in the cylinder block may result in undesirably extended lengths of oil passages, and this may prevent a favorable feeding of lubricating oil to the radial journal bearing.

It is also known to spray an oil jet ejected from an oil jet nozzle projecting from a cylinder block onto a part of a sprocket (connected to an end of a crankshaft) at which the timing chain comes to mesh with the sprocket. See Japanese UM laid open publication No. 63-147511 (patent document 3).

The lubricating oil ejected from the oil jet nozzle may be able to favorably lubricate the exterior part of the sprocket such as the part thereof coming to mesh with the timing chain, but unable to lubricate the radial bearing interface between the fixed shaft member and sprocket in the case of an idler sprocket.

BRIEF SUMMARY OF THE INVENTION

In view of such problems of the prior art, a primary object of the present invention is to provide a lubricating arrangement for a radial bearing of a power transmitting system that can provide a favorable lubricating performance without imposing any restriction on the positioning of a rotating member to be lubricated.

A second object of the present invention is to provide a lubricating arrangement which can favorably feed lubricating oil in a radial bearing interface defined between a rotating member such as a sprocket and a fixed shaft member typically affixed to a cylinder block.

A third object of the present invention is to provide a lubricating arrangement which can simplify the structure of the oil passages into and out of an oil pump.

A fourth object of the present invention is to provide a lubricating arrangement for lubricating an idler sprocket or pulley for a timing chain or belt of an internal combustion engine.

According to the present invention, at least part of such objects can be accomplished by providing a lubricating arrangement for a bearing, comprising: a fixed shaft member fixedly affixed to a base member; a rotatable member having a central opening and rotatably supported by the fixed shaft member at the central opening, a radial bearing interface being defined between an outer circumferential surface of the fixed shaft member and an internal circumferential surface of the central opening; an oil nozzle provided on a member which is fixed relative to the fixed shaft member, and provided with a first orifice which is configured to feed lubricating oil to the radial bearing interface between the rotatable member and fixed shaft member.

By directing an oil jet onto the radial bearing interface between the rotatable member and fixed shaft member, a favorable lubrication of the radial bearing for the rotating member can be ensured. The radial bearing typically consists of a journal bearing by may also include a ball or roller bearing.

Typically, according to the present invention, the lubricating arrangement further comprises a first thrust member fixed relative to the fixed shaft member and abutting a first axial end surface of the rotatable member; and a first lubricating oil passage formed at least partly by the first thrust member and extending radially from an open outer end opening out to a peripheral part of the first thrust member to an open inner end communicating with the radial bearing interface; wherein the first orifice of the oil nozzle is directed to the open outer end of the first lubricating oil passage.

The first lubricating oil passage communicates with the radial bearing interface, and has an open outer end which is fixed in position. Therefore, by directing the oil jet from the first orifice of the oil nozzle onto the open outer end of the first lubricating oil passage, an adequate amount of lubricating oil can be supplied to the radial bearing interface, and this ensures a favorable lubricating performance.

Typically, an endless member such as an endless chain or endless belt is passed on a first side of the rotatable member under tension, and the open inner end of the first lubricating oil passage openes out to a part of the radial bearing interface corresponding to a second side of the rotatable member opposite to the first side.

In other words, the open inner end of the first lubricating oil passage communicates with a part of the radial bearing interface defining a largest radial clearance or gap, and this promotes an efficient feeding of the lubricating oil into the radial bearing interface, and hence a favorable lubrication of the radial bearing interface.

According to a preferred embodiment of the present invention, the lubricating arrangement comprises a second lubricating oil passage extending radially adjacent to a second axial end surface of the rotatable member facing away from the first axial end surface thereof, and the second lubricating oil passage has an open outer end opening out to a peripheral part of the rotatable member and an open inner end communicating with the radial bearing interface.

In such an arrangement, the lubricating oil that has lubricated the radial bearing interface is expelled from the second lubricating oil passage under the centrifugal force acting on the lubricating oil, and this promotes a favorable re-circulation of the lubricating oil. Thereby, the radial bearing receives a constant supply of fresh lubricating oil, and this promotes not only a favorable lubrication of the radial bearing interface but also efficient removal of heat from the radial bearing interface.

The lubricating arrangement may further comprise a nozzle including a second orifice which is directed to the open outer end of the second lubricating oil passage when the rotatable member is at a prescribed angular position.

Thereby, as the rotating member rotates, the open outer end of the second lubricating oil passage receives a supply of lubricating oil from the second orifice of the nozzle intermittently, and this helps lubricating oil to be supplied to the radial bearing interface when the first lubricating oil passage is unable to feed an adequate amount of lubricating oil to the radial bearing interface for any reason.

Preferably, the first and second orifices are provided in a same nozzle, which is elongated in an axial direction parallel to a central axial line of the fixed shaft member, at axially spaced apart positions. Thereby, the nozzle arrangement and associated oil passage arrangement can be simplified.

Typically, the radial bearing interface is formed by a journal bearing which includes an annular oil groove extending at least partly around an entire circumference of the journal bearing and an axial oil groove having an end communicating with the open inner end of the first lubricating oil passage and another end communicating with the annular oil groove.

Thereby, the lubricating oil is supplied to the radial bearing interface uniformly both in the circumferential direction and axial direction, and this enhances a favorable lubrication of the radial bearing interface.

Typically, the first lubricating oil passage is defined by a groove formed on a surface of the first thrust member opposing the rotatable member and the first axial end surface of the rotatable member. This not only simplifies the forming of the first lubricating oil passage but also promotes the lubrication of a thrust bearing of the rotating member.

Likewise, the lubricating arrangement may further comprises a second thrust member abutting the second axial end surface of the rotatable member; wherein the second lubricating oil passage is defined by a groove formed on the second axial end surface of the rotatable member and a surface of the second thrust member opposing the rotatable member. This, again, not only simplifies the forming of the first lubricating oil passage but also promotes the lubrication of a thrust bearing of the rotating member on an opposite axial end thereof.

According to a preferred embodiment of the present invention, the lubricating arrangement may further comprises a tubular bush member fitted into the central opening of the rotatable member and a collar fitted on the fixed shaft member, the radial bearing interface being defined between an inner circumferential surface of the tubular bush member and an outer circumferential surface of the collar.

Thus, the various components forming the radial bearing interface and defining the oil passages are made of separate and individual members that may be made of different suitable materials and may be processed individually so that the performance of the bearing arrangement for the rotating member can be optimized at a minimum manufacturing cost.

Typically, the member on which the oil nozzle is provided includes a cover member that covers the endless member in cooperation with the base member to which the fixed shaft is affixed. In such a case, the cover member may be provided with a relatively flat wall of a large area, and this affords a high level of freedom in positioning the oil nozzle. The cover member may also be fitted with an oil pump for the lubricating oil, and may include oil passages for feeding oil to the oil pump and conducting oil expelled from the oil pump to the oil nozzle. Thus, the cover member can provide a convenient parts for mounting the oil pump and forming the oil passages.

According to a preferred embodiment of the present invention, the base member comprises a cylinder block, and the rotatable member comprises an idler sprocket or pulley for a timing chain or belt for transmitting a torque from a crankshaft to a camshaft.

BRIEF DESCRIPTION OF THE DRAWINGS

Now the present invention is described in the following with reference to the appended drawings, in which.

DETAILED DESCRIPTION OF THE PREFERRED EMBODIMENTS

FIGS. 1 to 6 illustrate an embodiment of the lubricating arrangement for a journal bearing according to the present invention which is applied to a lubricating arrangement for a journal bearing of an idler sprocket for an endless chain or the like for transmitting power from a crankshaft to a camshaft in a valve actuating mechanism for an internal combustion engine.

Figure 1:
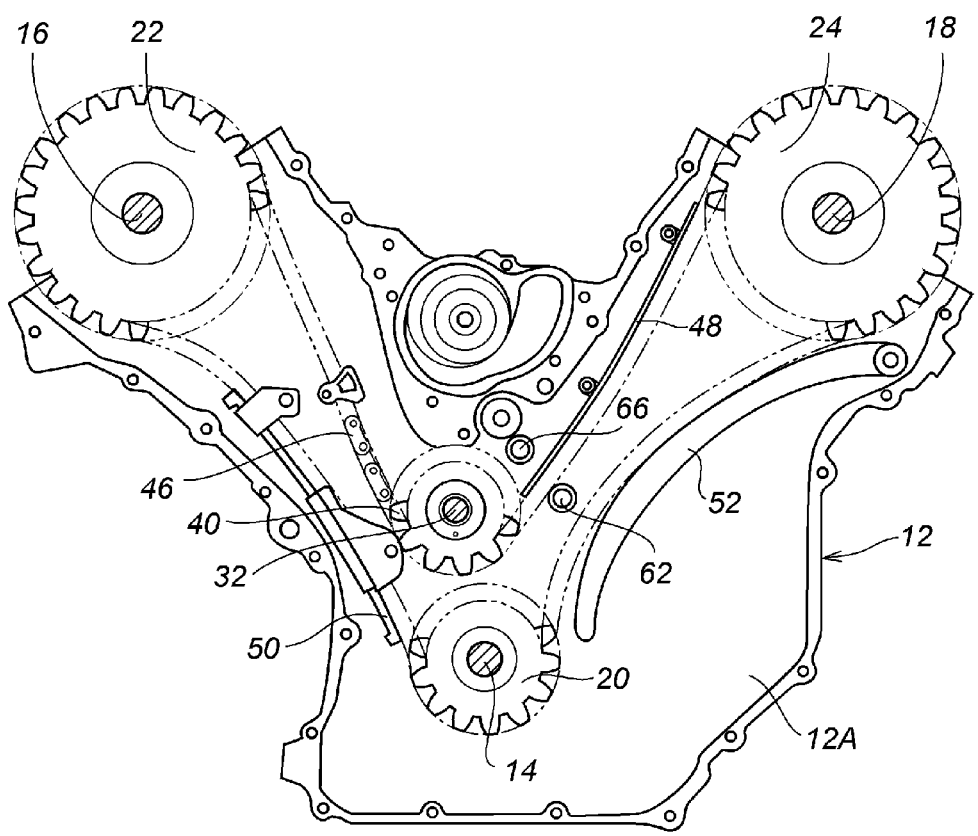
FIG. 1 is a front view, partly in section, of an internal side of a chain cover which is attached to an axial end of a cylinder block to which the lubricating arrangement for a journal bearing embodying the present invention is applied.
Figure 2:
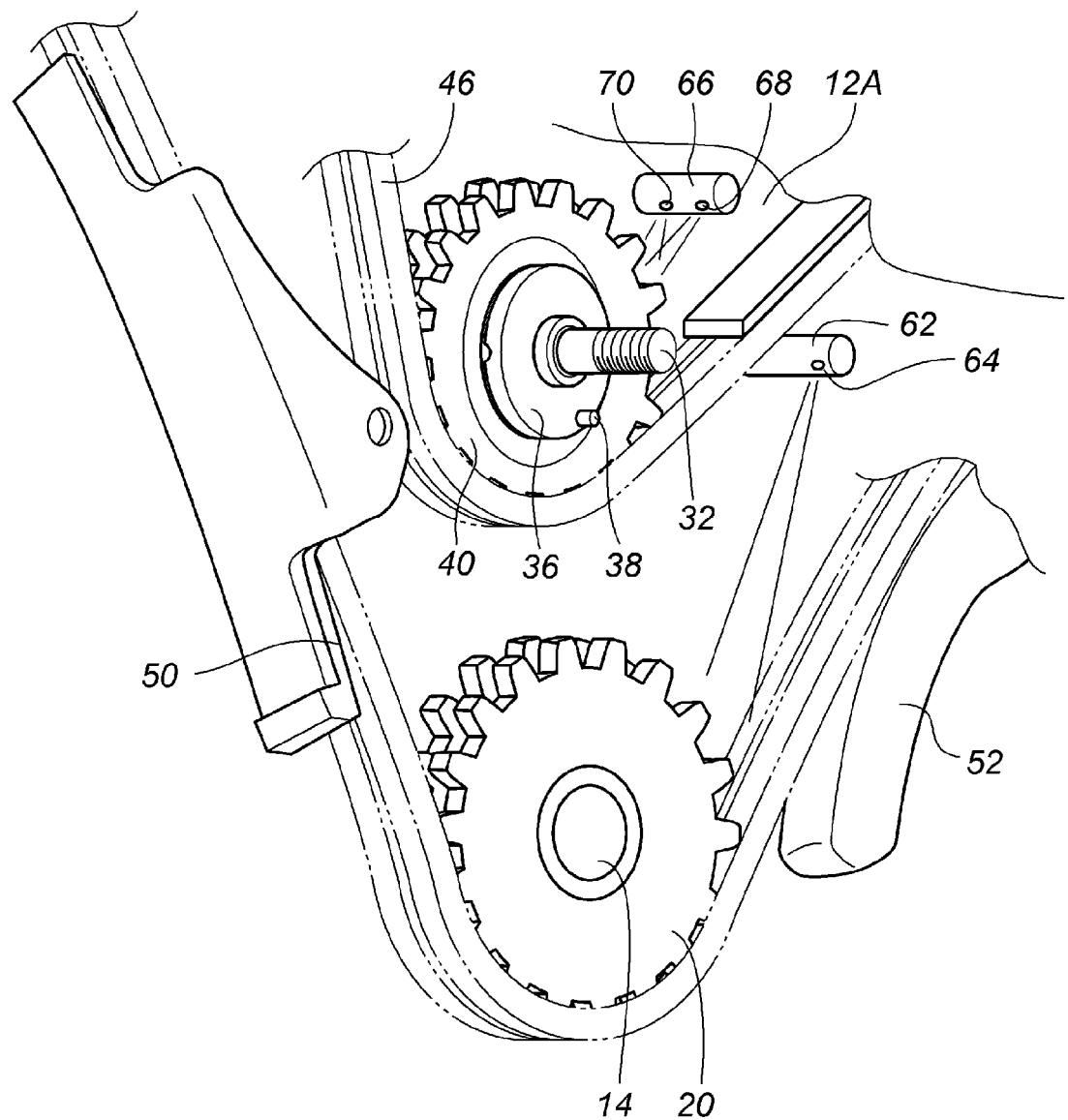
FIG. 2 is a fragmentary perspective view of the lubricating arrangement for a journal bearing as seen from the internal side of the chain cover.

Referring to FIGS. 1 and 2, a chain cover 12 is attached to an axial end of a cylinder block 10 of a V-type engine (see FIG. 4), the cylinders of each bank being arranged along the axial line. The cylinder block 10 supports a crankshaft 14, a camshaft 16 for a right bank and a camshaft 18 for a left bank. A crankshaft sprocket 20 is attached to an end of the crankshaft 14, and a camshaft sprocket 22, 24 is attached to a corresponding end of each of the camshafts 16 and 18. It should be noted that the present invention is not limited by this particular engine type but may also be applied to various other engine types including inline cylinder engines as well.

An endless chain 46 is passed around the crankshaft sprocket 20 and the two camshaft sprockets 22 and 24. An idler sprocket 40 is provided on the axial end of the cylinder block 10 adjacent to a bottom of a valley portion located between the two cylinder banks, and engages a back side of the endless chain 46. Thus, the endless chain 46 extends in the shape of letter V with the central part thereof defined by the crankshaft sprocket 20 and idler sprocket 40 and the two outer ends by the camshaft sprockets 22 and 24. The chain cover 12 is provided with fixed chain guides 48 and 50 each extending along a certain length of the endless chain 46, and a tensioner lever 52 also extending along a certain length of the endless chain 46 and pivotally supported at an end thereof so as to be pivotable toward and away from the endless chain 46 and thereby adjust the tension of the endless chain 46.

The chain cover 12 is typically made of die cast aluminum alloy, and is attached to the axial end of the cylinder block 10 to generally cover the endless chain 46. More specifically, the chain cover 12 includes a peripheral part formed as a flange for attaching the chain cover 12 to the axial end of the cylinder block 10 and a bottom wall 12A which is generally planar and spaced away from the axial end of the cylinder block 10 by a prescribed distance to define a space to accommodate the endless chain 46 therein.

Figure 4:
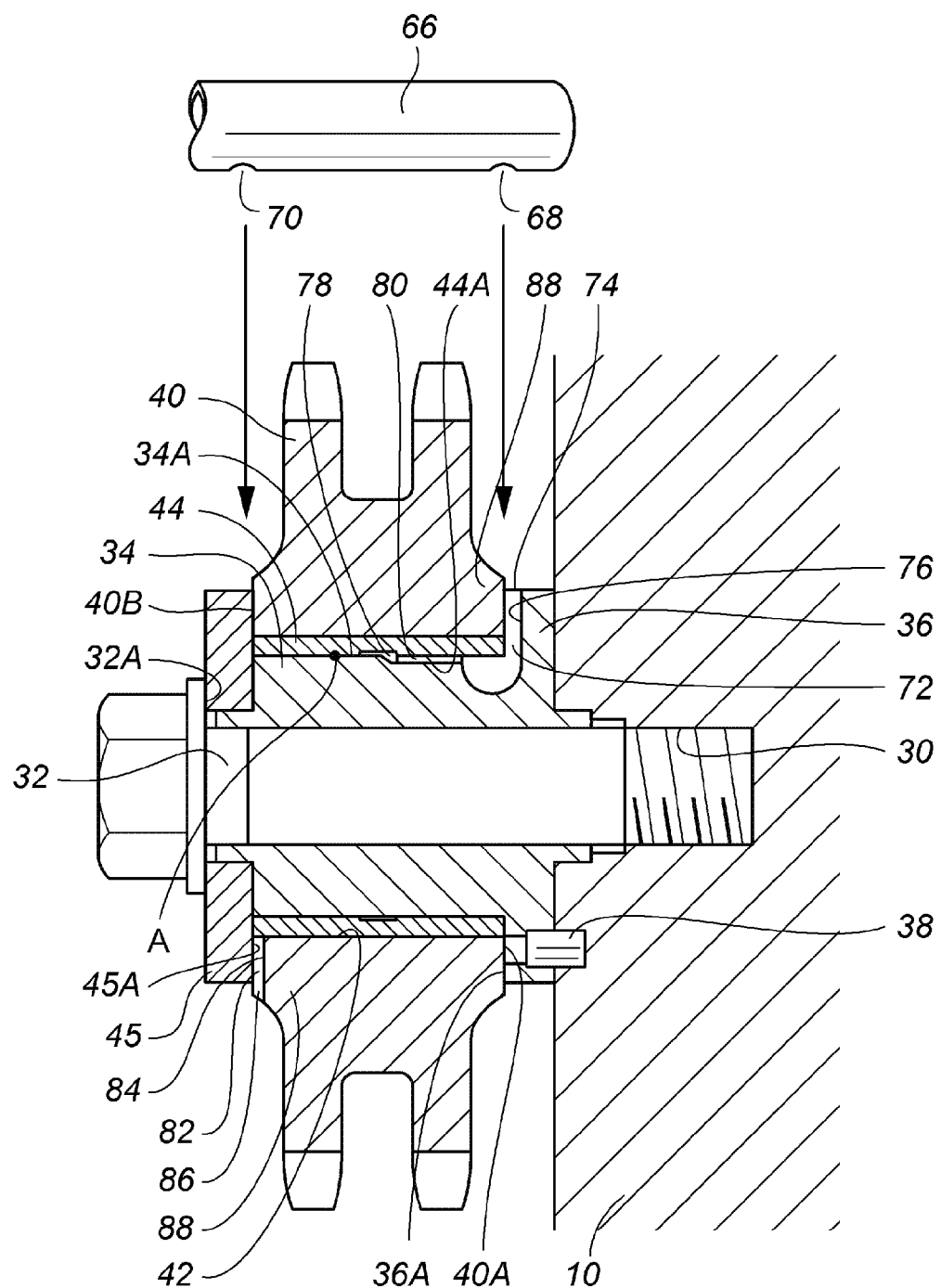
FIG. 4 is a vertical cross sectional view of the idler sprocket which is required to be lubricated.
Figure 5:
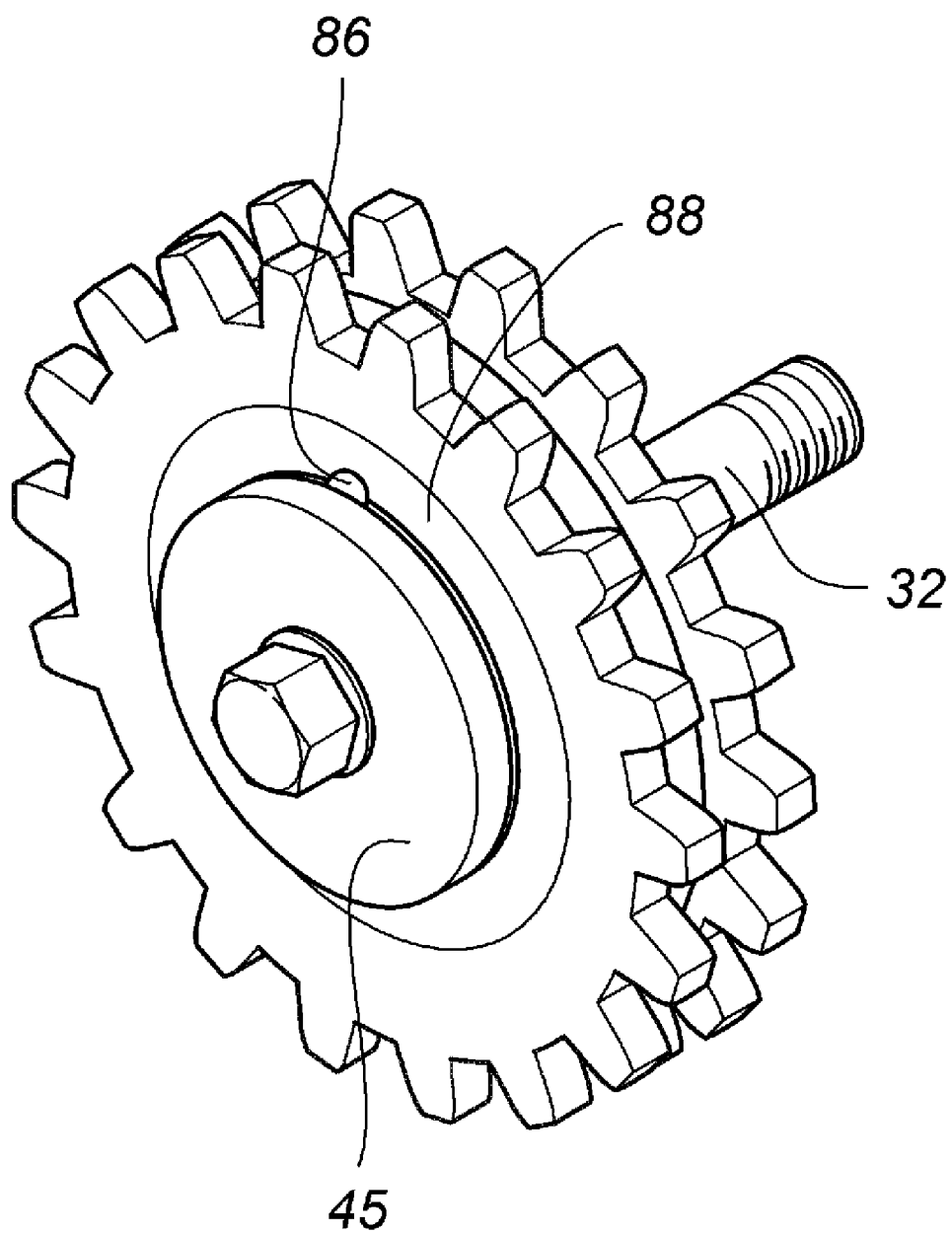
FIG. 5 is a perspective view of the idler sprocket as seen from the side of the chain cover.

Referring to FIG. 4, a threaded bolt 32 is passed through a central opening 42 of the idler sprocket 40, and is threaded into a threaded hole 30 formed in the axial end of the cylinder block 10. The threaded bolt 32 thus extends in the axial direction of the cylinder block 10, and is fixedly secured thereto.

A tubular collar 34 is fitted on a middle (smooth) part of the threaded bolt 32. The tubular collar 34 is provided with an annular thrust, member (radial flange) 36 at an end adjacent to the axial end of the cylinder block 10 to support a thrust force. The thrust member 36 is held rotatively fast to the cylinder block 10 by a pin 38, and this prevents the rotation of the tubular collar 34. The thrust member 36 may also be formed as a member separate from the tubular collar 34.

Into the central opening 42 of the idler sprocket 40 is fitted a tubular bush member 44 which in turn receives the outer circumferential surface of the collar 34 in a freely relatively rotatable manner.

Therefore, a radial bearing interface A is defined between the inner circumferential surface 44A of the bush member 44 and the outer circumferential surface 34A of the collar member 34, and this enables the idler sprocket 40 to freely rotate around a central axial line thereof.

An end surface 40A of an annular central part of the idler sprocket 40 is engaged by an opposing end surface 36A of the thrust member 36 of the collar member 40. The opposite end surface 40B of the annular central part of the idler sprocket 40 is engaged by a corresponding end surface 45A of an annular washer member 45 which is retained by an annular shoulder surface 32A of the head of the threaded bolt 32. Therefore, the idler sprocket 40 is axially held in position by and between the annular washer member 45 and thrust member 36.

Figure 3:
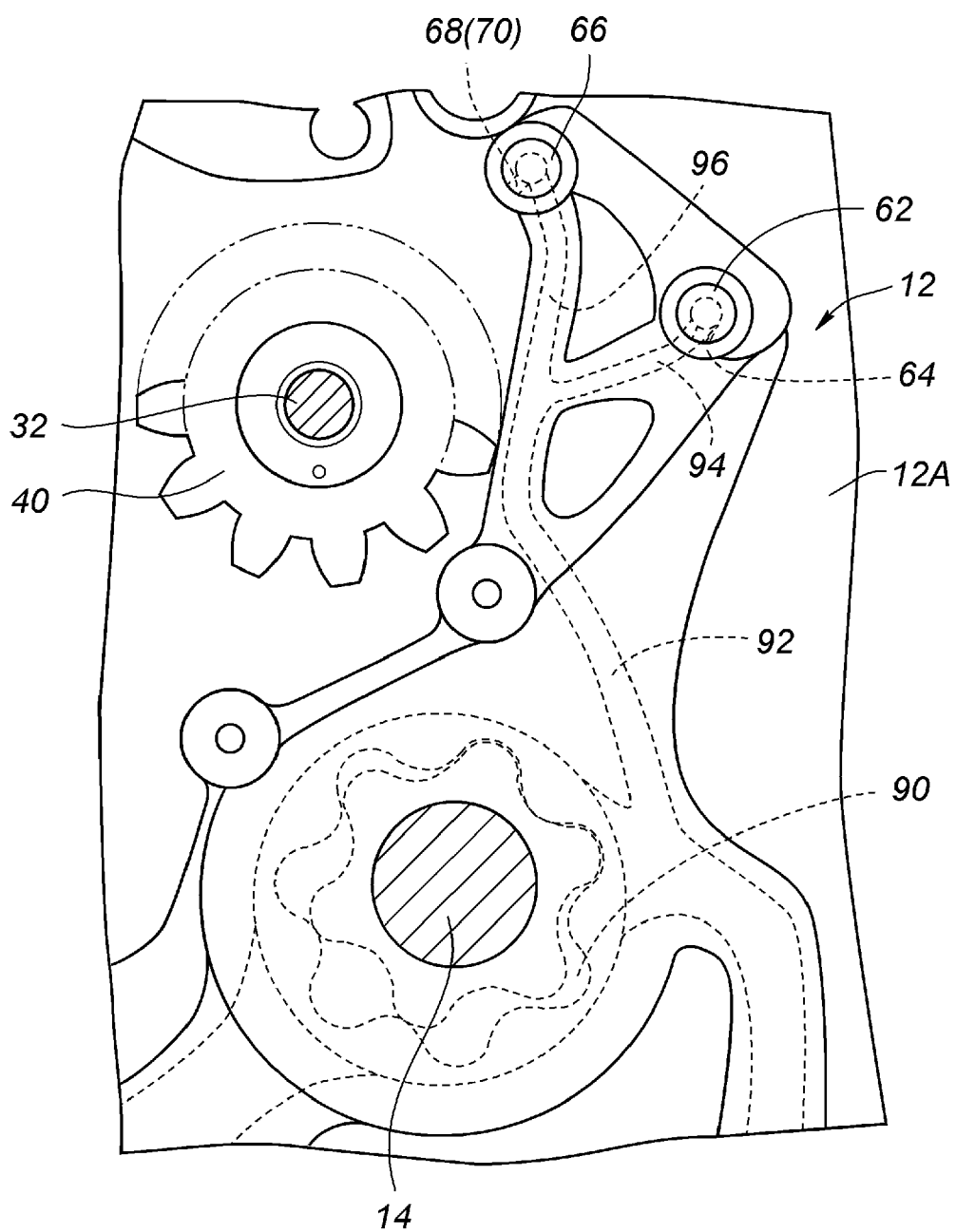
FIG. 3 is a fragmentary front view of the lubricating arrangement for a journal bearing as seen from the internal side of the chain cover.

The chain cover 12 is provided with a pair of oil nozzles 62 and 66 projecting from the bottom wall 12A thereof toward the cylinder block 10 and an oil pump 90 as indicated by the dotted lines in FIG. 3. The oil pump 90 consists of a trochoid type internal gear pump, and is configured to be directly actuated by the crankshaft 14. The chain cover 12 is further provided with lubricating oil passages 92, 94 and 96 for conducting the lubricating oil expelled from the oil pump 90 to the oil nozzles 62 and 66.

Referring to FIG. 2, one of the oil nozzles 62 is provided with an oil ejection orifice 64 to direct an oil jet to an area where the crankshaft sprocket 20 come to engage the endless chain 46. The other oil nozzle 66 is located adjacent to the idler sprocket 40, and is provided with a pair of oil ejection orifices 68 and 70 in an axially spaced apart relationship to direct oil jets to outer peripheral parts of the two axial end portions of the central part of the idler sprocket 40, respectively.

Referring to FIG. 4, the thrust member 36 is provided with a first lubricating oil passage 72 extending in a radial direction. The first lubricating oil passage 72 is defined by a groove 76 formed in the end surface 36A of the thrust member 36 facing the idler sprocket 40 and a flat end surface 40A of the idler sprocket 40 opposing the thrust member 36, and has an outer open end 74 that opens at the outer circumference of the thrust member 36 and an inner open end that communicates with a radial bearing interface (sliding interface) A between the tubular bush member 44 and tubular collar 34.

The outer open end 74 (see FIG. 6) of the first lubricating oil passage 72 is formed on the side (and upper side as seen in FIG. 1) of the idler sprocket 40 facing away from a section thereof on which the endless chain 46 is wrapped or a part of the radial bearing interface A defining a largest radial gap. The oil ejection orifice 68 of the oil nozzle 66 is directed to this outer open end 74 of the first lubricating oil passage 72 (see FIG. 6). This positional relationship is fixed during the operation of the engine because the thrust member 36 and the oil nozzle 66 are fixed in position at all times.

As shown in FIG. 4, an axially central part of the inner circumferential surface 44A (defining the radial bearing interface A) of the tubular bush member 44 is formed with an annular oil groove 78 extending over the entire circumference thereof However, the annular oil groove 78 may also extend only partly around the circumference of the tubular bush member 44. The outer circumferential surface 34A (defining the radial bearing interface A) of the tubular collar 34 is provided with an axial oil groove 80 communicating with the first lubricating oil passage 72 at one end thereof and with the annular oil groove 78 at the other end thereof.

The other axial end surface of the idler sprocket 40 (facing the bottom wall of the chain cover 12) is provided with a second lubricating oil passage 82 extending in a radial direction. The second lubricating oil passage 82 is defined by a groove 84 formed on an end surface 40B of the idler sprocket 40 facing the annular washer member 45 and an opposing flat end surface 45A of the annular washer member 45, and has an outer open end 86 opening toward an outer part of the idler sprocket 40 and an inner open end communication with the radial bearing interface A.

The radially central part of the idler sprocket 40 projects axially at each end surface thereof, and defines an annular boss 88 around the central opening 42 so that the end surfaces 40A and 40B of the idler sprocket 40 are given by the end surfaces of the annular boss 88. Therefore, the outer open end 86 of the second lubricating oil passage 82 opens out at an outer peripheral surface of the corresponding axial end of the annular boss 88 (see FIG. 5).

The other oil ejection orifice 70 of the oil nozzle 66 is directed to the part of the annular boss 88 at which the outer open end 86 of the second lubricating oil passage 82 opens out when the idler sprocket 40 is at a certain angular position.

Thus, a jet of lubricating oil ejected from the oil ejection orifice 68 of the oil nozzle 66 is sharply directed toward the outer open end 74 of the first lubricating oil passage 72, and this enables the lubricating oil to reach the radially inner part of the first lubricating oil passage 72, and then to the annular oil groove 78 via the axial oil groove 80. Thereby, lubricating oil is favorably distributed over the entire axial length and entire circumference of the radial bearing interface A.

Because the positional relationship between the oil ejection orifice 68 and outer open end 74 remains fixed without regard to the rotation of the idler sprocket 40, the lubricating oil ejected from the oil ejection orifice 68 is efficiently supplied to the first lubricating oil passage 72, and is supplied to the radial bearing interface A by an adequate amount. The radial force which the endless chain 46 applies to the idler sprocket 40 causes the radial gap of the radial bearing interface A to be greater on the side facing away from the part of the idler sprocket 40 on which the endless chain 46 is wrapped, and the inner open end directly communicates with the part of the radial bearing interface A defining the largest radial gap. This greatly increases the efficiency of supplying the lubricating oil into the radial bearing interface A.

Therefore, the lubricating performance of the journal bearing for the idler sprocket 40 can be optimized without imposing any restriction on the positioning of the idler sprocket 40.

Because the first lubricating oil passage 72 is defined by the groove 76 formed in the end surface of the thrust member 36 and the end surface 40A of the idler sprocket 40, the lubricating oil introduced into the first lubricating oil passage 72 is supplied also to a thrust bearing defined between the idler sprocket 40 and thrust member 36, and favorably lubricates this thrust bearing as well.

The lubricating oil which has been supplied to the radial bearing interface A for lubricating the journal bearing is eventually expelled out of the idler sprocket 40 via the second lubricating oil passage 82. Because the second lubricating oil passage 82 rotates with the idler sprocket 40, and the lubricating oil in the second lubricating oil passage 82 is therefore subjected to a centrifugal force during the operation of the engine, the lubricating oil is efficiently expelled from the second lubricating oil passage 82. Therefore, a favorable re-circulation of lubricating oil is achieved, and this improves the lubricating performance for the radial bearing interface.

Because the second lubricating oil passage 82 is defined by the groove 84 formed in the end surface 40B of the idler sprocket 40 and opposing end surface 45A of the annular washer member 45, the lubricating oil which has been introduced into the second lubricating oil passage 82 is also supplied to a thrust bearing defined between the idler sprocket 40 and annular washer member 45, and favorably lubricates this thrust bearing as well.

The other orifice 70 of the oil nozzle 66 ejects lubricating oil toward the part of the boss 88 where the outer open end 86 of the second lubricating oil passage 82 opens out. When lubricating oil is adequately supplied to the radial bearing interface A from the first oil passage 72, and some lubricating oil is expelled from the outer open end 86 of the second lubricating oil passage 82, the lubricating oil ejected from the orifice 70 is not supplied to the second lubricating oil passage 82. On the other hand, when lubricating oil is not adequately supplied to the radial bearing interface A, and no lubricating oil is expelled from the outer open end 86 of the second lubricating oil passage 82, the lubricating oil ejected from the orifice 70 is intermittently supplied to the second lubricating oil passage 82, and the second lubricating oil passage 82 which normally serves as a passage for expelling lubricating oil serves as a passage for intermittently introducing lubricating oil into the radial bearing interface A.

Therefore, the lubricating performance is improved further by intermittently supplying lubricating oil from the second lubricating oil passage 82, provided on the opposite side of the annular boss 88 of the idler sprocket 40 with respect to the first lubricating oil passage 72 as seen in the axial direction of the radial bearing interface A, to the radial bearing interface A. The first and second lubricating passages 72 and 82 may not be formed as grooves but also as holes formed in the thrust member 36 and boss 88, respectively.

In the illustrated embodiment, the oil nozzles 62 and 66, the oil pump 90 for supplying lubricating oil to these oil nozzles and the lubricating oil passages 92, 94 and 96 or the substantially entire components for lubricating the idler sprocket 40 relative to the endless chain 46 and the bearings for the idler sprocket 40 are all provided in the chain cover 12 so that the need for providing such components on the cylinder block, which is already crowded with various other components, can be avoided. Furthermore, because the oil nozzles 62 and 66 can be provided in close proximity to the outlet end of the oil pump 90, the length of each of the lubricating oil passages 92, 94 and 96 can be minimized, and this ensures the ejection of lubricating oil from each orifice to be maintained in a stable manner and the radial bearing interface A to be lubricated in a favorable manner at all times.

Because the chain cover 12 covers the entire power transmitting mechanism including the endless chain 46, the bottom wall 12A extends over a large area and is generally planar. Therefore, there is no restriction on the positioning of the oil nozzles 62 and 66, and they can be positioned in an optimum fashion. In the illustrated embodiment, the oil nozzle 66 was provided with two oil ejecting orifices 68 and 70, but these orifices may also be provided in separate oil nozzles which may be located at different angular positions with respect to the rotational center of the idler sprocket 40.

Figure 6:
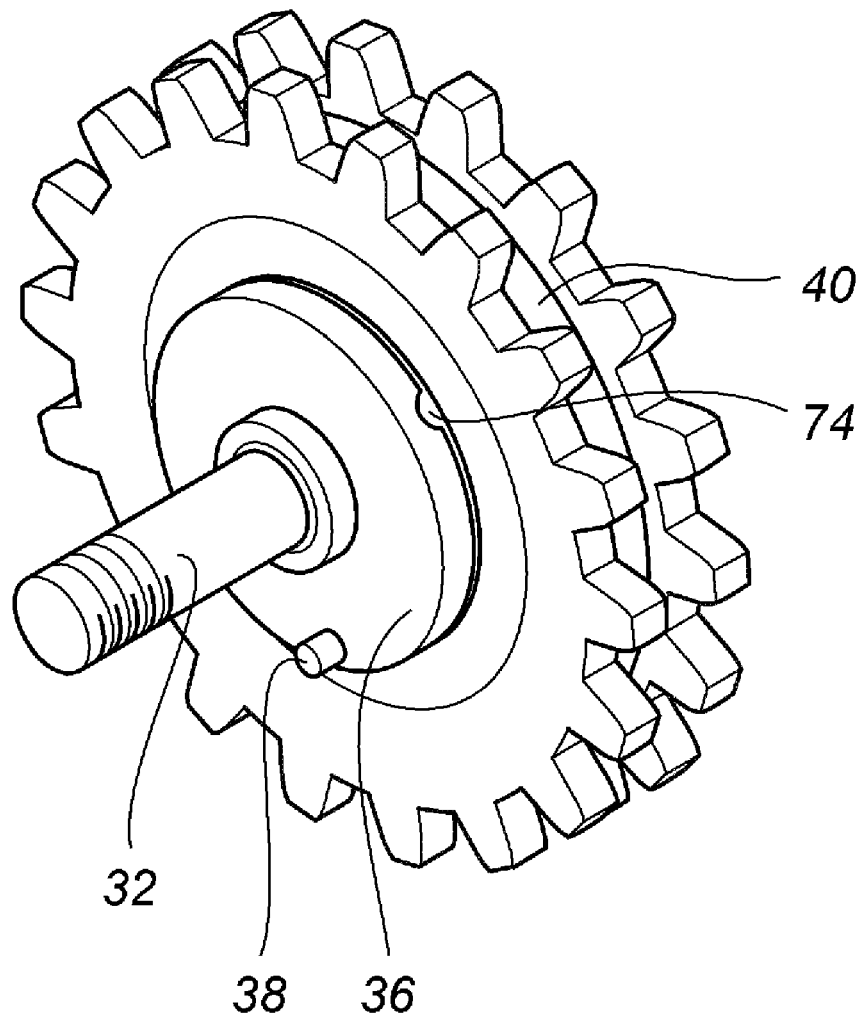
FIG. 6 is a perspective view of the idler sprocket as seen from the side of the cylinder block.
Figure 7:
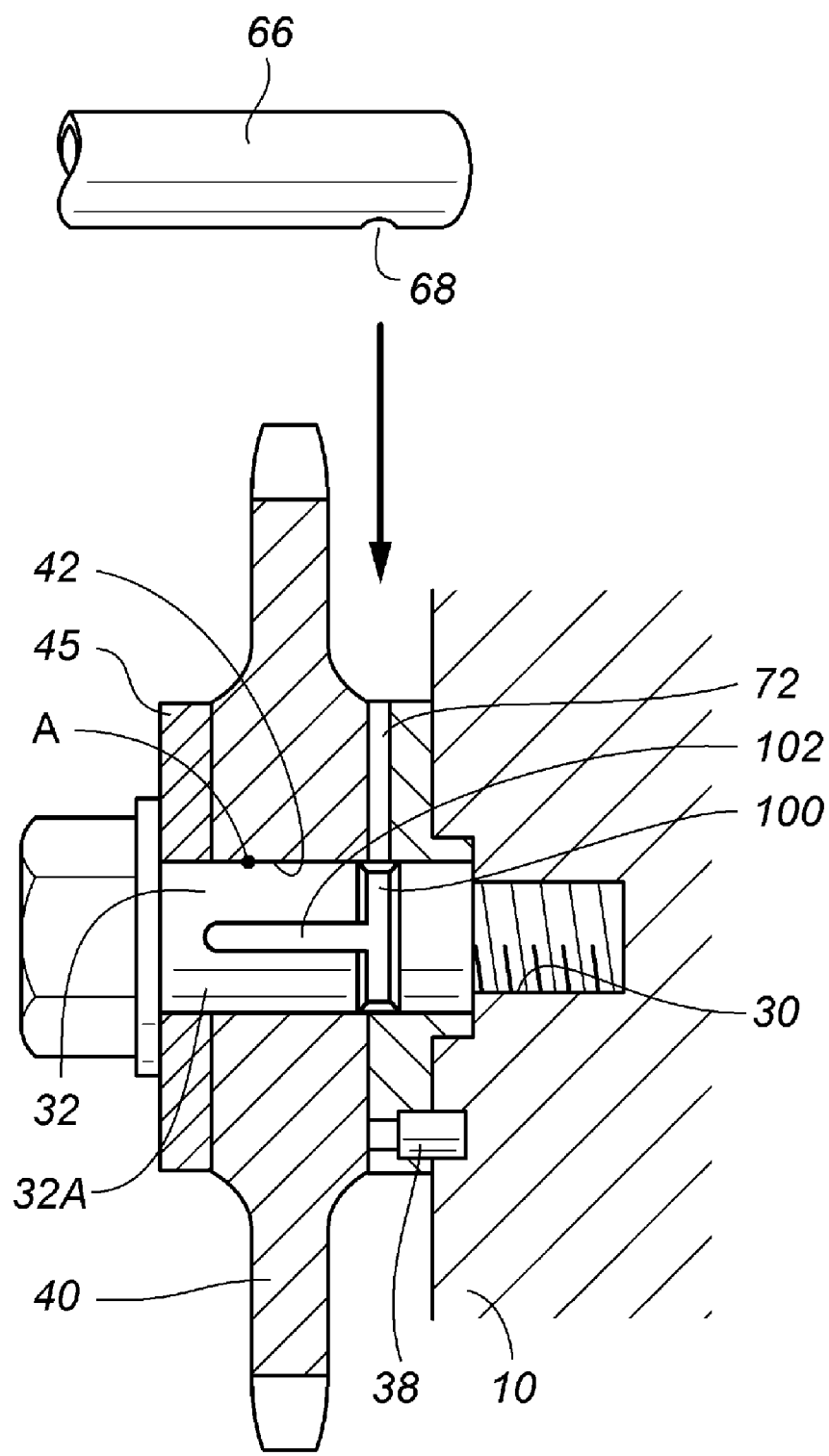
FIG. 7 is a vertical sectional view similar to FIG. 3 showing an alternate embodiment of the present invention.

FIG. 6 illustrates an alternate embodiment of the lubricating arrangement for a journal bearing according to the present invention. In FIG. 6, the parts corresponding to those shown in FIG. 3 are denoted with like numerals without repeating the description of such parts.

In this embodiment, the tubular collar 34 and tubular bush member 44 used in the previous embodiment are omitted, and the idler sprocket 40 is directly supported by a smooth part 32A of the threaded bolt 32 in a freely rotatable manner. Therefore, in this case, the radial bearing interface A is defined between the inner circumferential surface of the central opening 42 and the outer circumferential surface of the smooth part 32A of the threaded bolt 32.

The outer circumferential surface of the smooth part 32A of the threaded bolt 32 is formed with a circumferential groove 100 directly communicating with the first lubricating oil passage 72 and an axial groove 102 communicating with the circumferential groove 100. Therefore, lubricating oil can be evenly and favorably distributed in the radial bearing interface A both circumferentially and axially, and a favorable lubricating performance can be achieved. This embodiment is otherwise similar to the previous embodiment.

The threaded bolt 32 was fixedly secured to the cylinder block 10 in the foregoing embodiments, but may also be fixedly secured to the chain cover 12 or a cylinder head not shown in the drawing. The present invention is also applicable to other forms of power transmitting systems such as those using cogged belts and other endless belts requiring lubrication. Also, the radial bearing interface in the foregoing embodiments was formed as a journal bearing, but may also be formed as a ball or roller bearing without departing from the spirit of the present invention.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A lubricating arrangement for a bearing, comprising:
   a fixed shaft member fixedly affixed to a base member;
   a rotatable member having a central opening and rotatably supported by the fixed shaft member at the central opening, a radial bearing interface being defined between an outer circumferential surface of the fixed shaft member and an internal circumferential surface of the central opening;
   an oil nozzle provided on a member which is fixed relative to the fixed shaft member, and provided with a first orifice which is configured to feed lubricating oil to the radial bearing interface between the rotatable member and fixed shaft member;

a first thrust member fixed relative to the fixed shaft member and abutting a first axial end surface of the rotatable member; and a first lubricating oil passage formed at least partly by the first thrust member and extending radially from an open outer end opening out to a peripheral part of the first thrust member to an open inner end communicating with the radial bearing interface, wherein the first orifice of the oil nozzle is directed to the open outer end of the first lubricating oil passage.

2. The lubricating arrangement according to claim 1, further comprising an endless member passed on a first side of the rotatable member under tension;

the open inner end of the first lubricating oil passage opening out to a part of the radial bearing interface corresponding to a second side of the rotatable member opposite to the first side.

3. The lubricating arrangement according to claim 2, further comprising a second lubricating oil passage extending radially adjacent to a second axial end surface of the rotatable member facing away from the first axial end surface thereof, the second lubricating oil passage having an open outer end opening out to a peripheral part of the rotatable member and an open inner end communicating with the radial bearing interface.

4. The lubricating arrangement according to claim 3, further comprising a nozzle including a second orifice which is directed to the open outer end of the second lubricating oil passage when the rotatable member is at a prescribed angular position.

5. The lubricating arrangement according to claim 4, wherein the first and second orifices are provided in a same nozzle, which is elongated in an axial direction parallel to a central axial line of the fixed shaft member, at axially spaced apart positions.

6. The lubricating arrangement according to claim 3, wherein the radial bearing interface is defined by a journal bearing which includes an annular oil groove extending at least partly around an entire circumference of the journal bearing and an axial oil groove having an end communicating with the open inner end of the first lubricating oil passage and another end communicating with the annular oil groove.

7. The lubricating arrangement according to claim 1, wherein the first lubricating oil passage is defined by a groove formed on a surface of the first thrust member opposing the rotatable member and the first axial end surface of the rotatable member.

8. The lubricating arrangement according to claim 3, further comprising a second thrust member abutting the second axial end surface of the rotatable member;

wherein the second lubricating oil passage is defined by a groove formed on the second axial end surface of the rotatable member and a surface of the second thrust member opposing the rotatable member.

9. The lubricating arrangement according to claim 1, further comprising a tubular bush member fitted into the central opening of the rotatable member and a collar fitted on the fixed shaft member, the radial bearing interface being defined between an inner circumferential surface of the tubular bush member and an outer circumferential surface of the collar.

10. The lubricating arrangement according to claim 2, wherein the member on which the oil nozzle is provided includes a cover member that covers the endless member in cooperation with the base member to which the fixed shaft is affixed.

11. The lubricating arrangement according to claim 10, further comprising an oil pump mounted on the cover member, the cover member including oil passages for feeding oil to the oil pump and conducting oil expelled from the oil pump to the oil nozzle.

12. The lubricating arrangement according to claim 1, wherein the base member comprises a cylinder block, and the rotatable member comprises an idler sprocket or pulley for a timing chain or belt for transmitting a torque from a crankshaft to a camshaft.

* * * * *